(12) United States Patent
Furuya

(10) Patent No.: US 7,460,879 B2
(45) Date of Patent: Dec. 2, 2008

(54) MOBILE COMMUNICATION SYSTEM, MOBILE TERMINAL, TRANSMIT POWER CONTROL METHOD IN A MOBILE TERMINAL, AND PROGRAM

(75) Inventor: Tomoki Furuya, Tokyo (JP)

(73) Assignee: NEC Corporation, Tokyo (JP)

( * ) Notice: Subject to any disclaimer, the term of this patent is extended or adjusted under 35 U.S.C. 154(b) by 736 days.

(21) Appl. No.: 11/145,947

(22) Filed: Jun. 7, 2005

(65) Prior Publication Data

US 2006/0003786 A1 Jan. 5, 2006

(30) Foreign Application Priority Data

Jun. 9, 2004 (JP) ............................. 2004-170614

(51) Int. Cl.
*H04Q 7/20* (2006.01)
(52) U.S. Cl. ..................... 455/522; 455/69; 455/68; 455/501; 455/500; 455/517; 370/343
(58) Field of Classification Search ............... 455/522, 455/501, 68, 69, 550.1, 67.11, 63.01, 422.1, 455/403, 445, 500, 517, 73; 370/343
See application file for complete search history.

(56) References Cited

U.S. PATENT DOCUMENTS

2005/0075122 A1* 4/2005 Lindoff et al. ............... 455/522

2005/0099968 A1* 5/2005 Yamano ..................... 370/311

FOREIGN PATENT DOCUMENTS

| EP | 1 487 132 | 12/2004 |
| WO | WO 02/093757 | 11/2002 |

OTHER PUBLICATIONS

Technical Specification: 3GPP TS 25.214, V4.1.0 (Jun. 2001); 3rd Generation Partnership Project.

* cited by examiner

*Primary Examiner*—Keith T Ferguson
(74) *Attorney, Agent, or Firm*—Sughrue Mion, PLLC

(57) ABSTRACT

A method of performing transmit power control is performed based on ISCP which a mobile terminal calculates from a downlink received signal. A transmission/reception unit of the mobile terminal transmits and receives a radio signal to/from a radio base station through an antenna. A transmission/reception control unit performs control relating to the signal processing in the transmission/reception unit. A control unit Performs control concerning operation of each unit of the mobile terminal. A measurement unit measures ISCP and DPCH power from the signal received in the transceiver unit, and transmits the measured values to the control unit. A characteristic value conversion unit prepares a relation between the ISCP which satisfies a preset target BLER and the measured DPCH power, based on BLERs previously measured in a communication environment where the mobile terminal is located.

28 Claims, 4 Drawing Sheets

| ISCP [dBm] | DPCH [dBm] |
|---|---|
| −50 | −20 |
| −51 | −21 |
| −52 | −22 |
| −53 | −23 |
| −54 | −24 |
| −55 | −25 |
| ⋮ | ⋮ |
| −105 | −75 |
| −106 | −76 |
| −107 | −77 |
| −108 | −78 |
| −109 | −79 |
| −110 | −80 |

FIG.2

MOBILE COMMUNICATION SYSTEM, MOBILE TERMINAL, TRANSMIT POWER CONTROL METHOD IN A MOBILE TERMINAL, AND PROGRAM

BACKGROUND OF THE INVENTION

1. Field of the Invention

The present invention relates to transmit power control of a downlink dedicated physical channel (DPCH) in a mobile communication system using wideband code division multiple access (W-CDMA).

2. Description of the Related Art

In a W-CDMA mobile communication system, a technology called closed-loop transmit power control using both inner loop power control and outer loop power control is used (e.g., see 3GPP TS 25.214 V4.1.0 (2001-06)).

In this closed-loop transmit power control, a receiving end measures a quality of a communication channel, and transmits a transmit power control (TPC) signal based on the measurement result by using a dedicated physical control channel (DPCCH) on a line loop-back to a transmitting end. The transmitting end receives the TPC signal and controls the transmit power value of the communication channel on transmission based on the UP/DOWN command appended to the TPC signal. Therefore, it is controlled so that the downlink communication channel in the receiving end satisfies required quality.

In the inner loop power control of one of them, as shown in FIG. 4, first, the receiving end (mobile terminal 1 in FIG. 4) measures a signal to interference ratio (SIR). Next, the receiving end compares the measured SIR and a target SIR. If the measured SIR is smaller than the target SIR, the receiving end transmits the TPC signal with an "UP" command to the transmitting end (radio base station 2 in FIG. 4), meanwhile, if the measured SIR is larger than the target SIR, the receiving end transmits the TPC signal with a "DOWN" command to the transmitting end. The transmitting end which has received the TPC signal changes the transmit power of the downlink communication channel by +/−1 dB based on the result of decoding the TPC signal. The receiving end performs such power control in a slot cycle. In addition, the slot cycle is one-fifteenth of one radio frame cycle which is 10 ms, that is, the slot cycle is 0.667 ms.

In another outer loop power control, the receiving end changes the target SIR value in the above-mentioned inner loop power control so that a communication quality value such as a bit error rate (BER) or a block error rate (BLER) satisfies a target quality value. For example, the receiving end measures a BLER which is one of communication quality values, and compares the measured BLER and a target BLER. Based on the comparison result, the receiving end increases the target SIR if the measured BLER is smaller than the target BLER, or decreases the target SIR if the measured BLER is larger than the target BLER. In addition, this communication quality value may be calculated by measuring continuously during a certain period (several hundred milliseconds to several seconds).

In the above-mentioned conventional closed-loop transmit power control, that is, transmit power control using inner loop power control and outer loop power control, particularly in the case of a communication environment in which the interference signal code power (ISCP) is low, the mobile terminal 1 continuously transmits the TPC signal with a "DOWN" command because the measured SIR is very larger than the target SIR.

As the radio base station 2 which has received the TPC signal continuously decreases the transmit power of downlink DPCH, the received power at the mobile terminal also continues to decrease. In the mobile terminal, the communication quality value is measured at the next timing, and the target SIR is increased at the time when it has been revealed that the measurement result does not satisfy the target quality value. However, an error occurs in order that the increment of the target SIR can not fulfill a proper value, Thus, in the transmit power control using inner loop power control and outer loop power control, the transmit power control suitable for communication environment cannot be performed because the inner loop power control differs in an updating cycle of power control from the outer loop power control greatly.

SUMMARY OF THE INVENTION

The present invention has been made to solve the above and other exemplary problems, and therefore an exemplary feature of the present invention is to perform a transmit power control according to a communication environment by which a receiving end measures an ISCP and a DPCH power in a present communication environment, and transmits suitably a TPC signal based on a characteristic value conversion tool previously prepared to a transmitting end.

In order to attain the above-mentioned and other exemplary features, the present invention provides a mobile communication system, including: a mobile terminal measuring an interference signal code power (ISCP) and a dedicated physical channel (DPCH) power which are communication quality values in a present communication environment, determining a target DPCH power corresponding to the measured ISCP by referring to a quality characteristic value conversion tool previously prepared, comparing the measured DPCH power and the target DPCH power, and transmitting a transmit power control (TPC) signal based on a comparison result to the transmitting end; and a radio base station controlling a DPCH power on transmission, based on the TPC signal received from the mobile terminal.

Also, the mobile terminal includes the quality characteristic value conversion tool drawing a relationship between the ISCP and the target DPCH power, whose relationship satisfies a preset target block error rate (BLER), using the ISCP, the DPCH power, and the BLER which are previously measured in the present communication environment.

Also, the mobile terminal transmits the TPC signal with a "DOWN" command to the transmitting end in a case where the measured DPCH power is larger than the target DPCH power, and transmits a TPC signal with an "UP" command to the radio base station in a case where the measured DPCH power is smaller than the target DPCH power.

Also, the mobile terminal can transmit the TPC signal in a case where the measured DPCH power continues more than a predetermined period in the state of smaller or larger than the target DPCH power.

Further, the mobile terminal may transmit the TPC signal only for a predetermined period in a case where the measured DPCH power continues more than a predetermined period in the state of smaller or larger than the target DPCH power.

Also, a mobile terminal of the present invention including: a transmission/reception unit for transmitting and receiving a radio signal to/from a radio base station; a transmission/reception control unit for performing control relating to transmission and reception in the transmission/reception unit; a measurement unit for measuring an ISCP and a DPCH power, which are communication quality values in a present communication environment; a quality characteristic value conversion tool for drawing a target DPCH power corresponding to the measured ISCP; and a control unit for determining the target DPCH power corresponding to the measured ISCP by referring to the quality characteristic value conversion tool, comparing the measured DPCH power and the target DPCH power, generating a TPC signal based on a comparison result, and outputting the TPC signal to the transmission/reception control unit.

Also, a program for executing a transmit power control according to the present invention is executed on a computer. This program includes each step which includes: measuring ISCP and DPCH power which are communication quality values in a present communication environment; determining target DPCH power corresponding to the measured ISCP by referring to a characteristic value conversion tool previously prepared; comparing the measured DPCH power and the target DPCH power; and transmitting a TPC signal to the transmitting end based on a comparison result.

The exemplary mobile communication system constituted as above-mentioned previously measures the ISCP, the BPCH power, and BLER in the present communication environment, and prepares the quality characteristic value conversion tool drawing a relationship between the ISCP and the target DPCH power, whose relationship satisfies the target BLER. Also, the mobile terminal measures an ISCP and a DPCH power which are communication quality values, determining a target DPCH power corresponding to the measured ISCP by referring to the quality characteristic value conversion tool, and transmit a TPC signal based on a comparison between the measured DPCH power and the target DPCH power to the transmitting end. The radio base station which has received the TPC signal controls the DPCH power on transmission based on the TPC signal.

Accordingly, it is possible to determine the target DPCH power which is the measured DPCH power satisfying the target quality from the measured ISCP, and to perform the transmit power control of the transmitting end based on a difference between the measured DPCH power and the target DPCH power.

Accordingly, the situation which an error occurs and a communication line stops service is avoidable by the following timing of measuring a communication quality value (e.g. BLER), in the conventional closed-loop transmit power control.

BRIEF DESCRIPTION OF THE DRAWINGS

The above and other exemplary features, and advantages of the present invention will become more apparent from the following detailed description when taken in conjunction with the accompanying drawings wherein:

FIG. 2 is a table form showing an example of a characteristic value conversion tool using in the mobile terminal shown in FIG. 1;

DETAILED DESCRIPTION OF THE EXEMPLARY EMBODIMENTS

Hereinafter, a description will be given in more detail of an exemplary mobile terminal according to the present invention with reference to the accompanying drawings.

Figure 1:
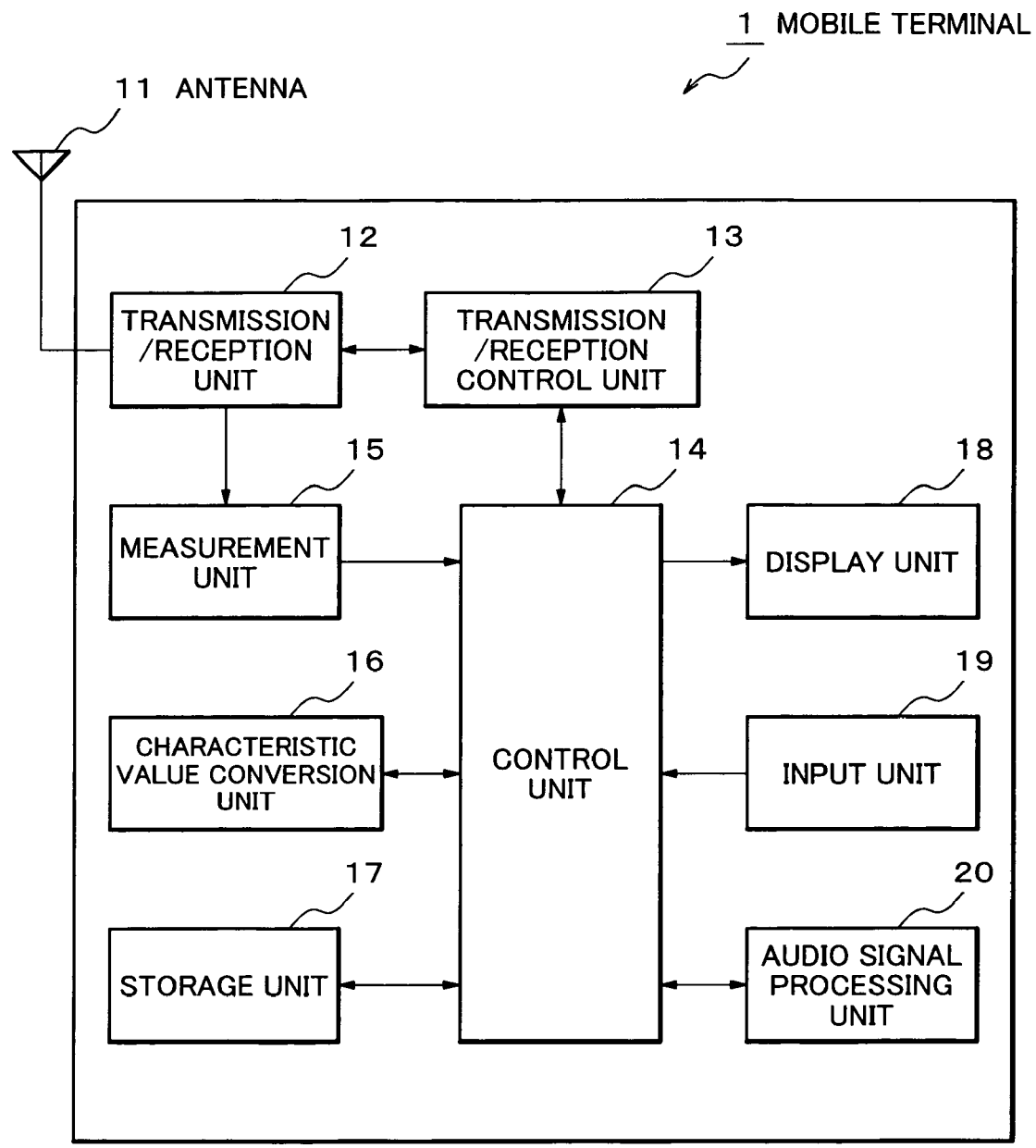
FIG. 1 is a block diagram showing a configuration of a mobile terminal according to an embodiment of the present invention.

FIG. 1 is a block diagram showing a configuration of a mobile terminal according to an embodiment of the present invention.

Referring to FIG. 1, the mobile terminal according to an embodiment of the present invention includes an antenna 11, a transmission/reception unit 12, a transmission/reception control unit 13, a control unit 14, a measurement unit 15, a characteristic value conversion unit 16, a storage unit 17, a display unit 18, an input unit 19, and an audio signal processing unit 20.

The transmission/reception unit 12 transmits and receives a radio signal to/from a radio base station (not shown, the radio base station 2 in FIG. 4) through the antenna 11.

The transmission/reception control unit 13 performs control relating to the signal processing in the transmission/reception unit 12.

The control unit 14 performs control relating to the operation of each unit of the mobile terminal 1.

The measurement unit 15 measures an interference signal code power (ISCP) and a dedicated physical channel (DPCH) power using a signal input from the transmission/reception unit 12, and outputs the measured values to the control unit 14.

The characteristic value conversion unit 16 has a characteristic value conversion tool drawing a relationship between the ISCP and the target DPCH power, whose relationship satisfies a preset target block error rate (BLER), using the ISCP, the DPCH power, and the BLER which are previously measured in the present communication environment where the mobile terminal 1 is located. As this characteristic value conversion tool, a table form, an arithmetic form, or a conventional algorithm may be used.

The storage unit 17 stores programs to be executed by the control unit 14 and personal data such as a telephone directory.

The display unit 18 visually displays inputted/outputted information.

The input unit 19 includes key switches and the like. A user can input information such as data or instructions through the input unit 19.

The audio signal processing unit 20 performs a conversion process between a transmitting/receiving signal and an audio signal at a telephone calling.

Figure 4:
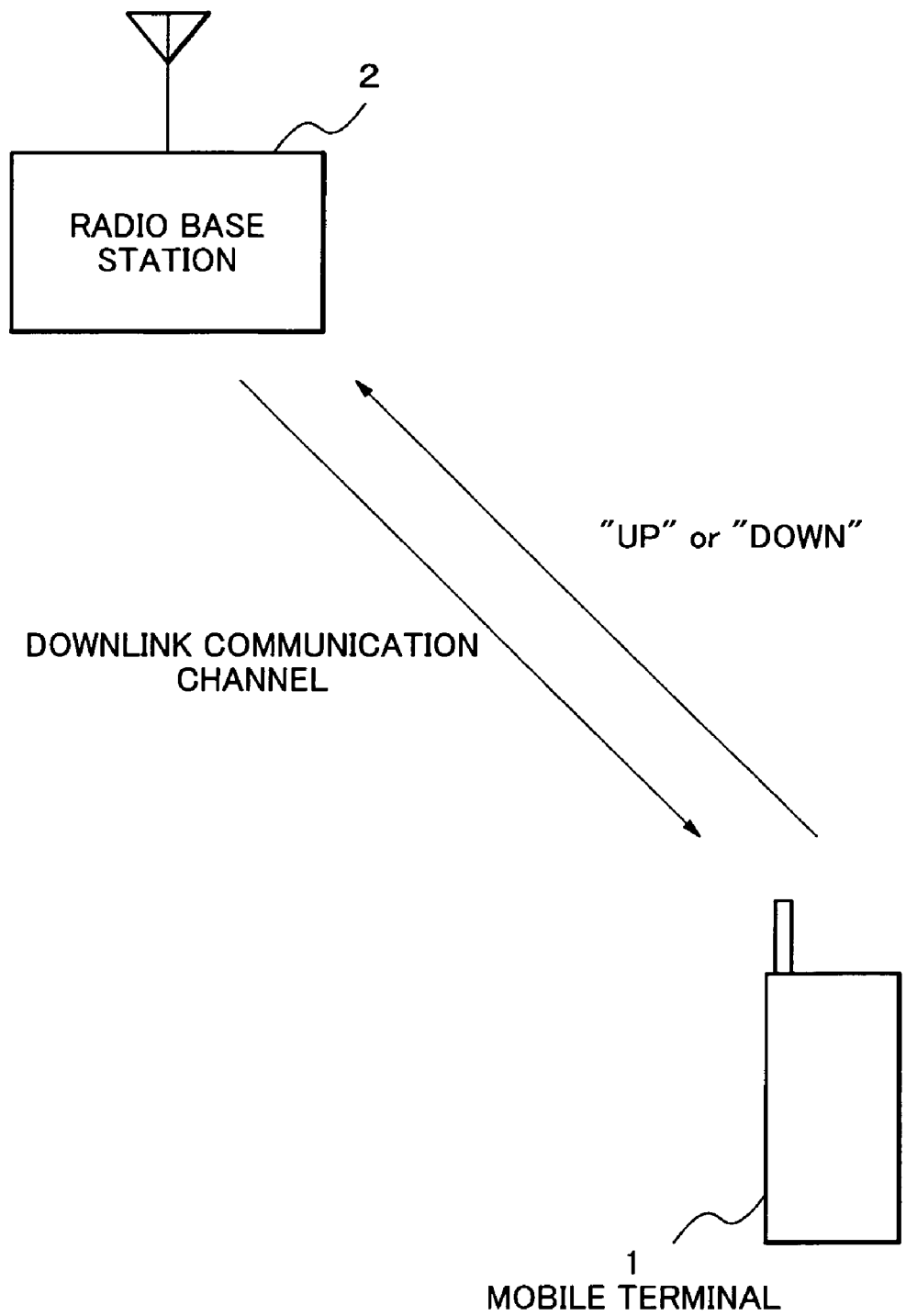
FIG. 4 is a diagram for explaining inner loop power control in a mobile communication system of the present invention.

Here, a mobile communication system according to this embodiment has the same configuration as the mobile communication system shown in FIG. 4, except for the use of the mobile terminal 1 having the above-mentioned configuration. And, the transmit power control is performed using inner loop power control and outer loop power control same as that of the above-mentioned explanation.

Also, a program for executing the transmit power control in the mobile terminal can be executed on a computer. When it is executed on the computer, the programs for executing the transmit power control are stored in a disk, a semiconductor memory, or any other recording media. The programs are loaded into the computer. The computer performs the operation in accordance with the loaded program, whereby the transmission/reception control unit 13, the control unit 14, the measurement unit 15, the characteristic value conversion unit 16, and the audio signal processing unit 20 are executed on the computer.

Next, the characteristic value conversion tool using a table form will be described. FIG. 2 is a table form showing an example of a characteristic value conversion tool using in the mobile terminal shown in FIG. 1.

In FIG. 2, the characteristic value conversion unit 16 has a table showing the relationship between the ISCP and the DPCH power, whose relationship satisfies the preset target BLER, using the BLER which are previously measured in the present communication environment where the mobile terminal 1 is located.

For example, ISCP (dBm) corresponding to measured value;
"−50", "−51", "−52", "−53", "−54", "−55", . . . , "−105", "−106", "−107", "−108", "−109", "−110", and DPCH power (dBm) corresponding to target value;
"−20", "−21", "−22", "−23", "−24", "−25", . . . "−75", "−76", "−77", "−78", "−79", "−80", are stored as one pair, respectively.

Figure 3:
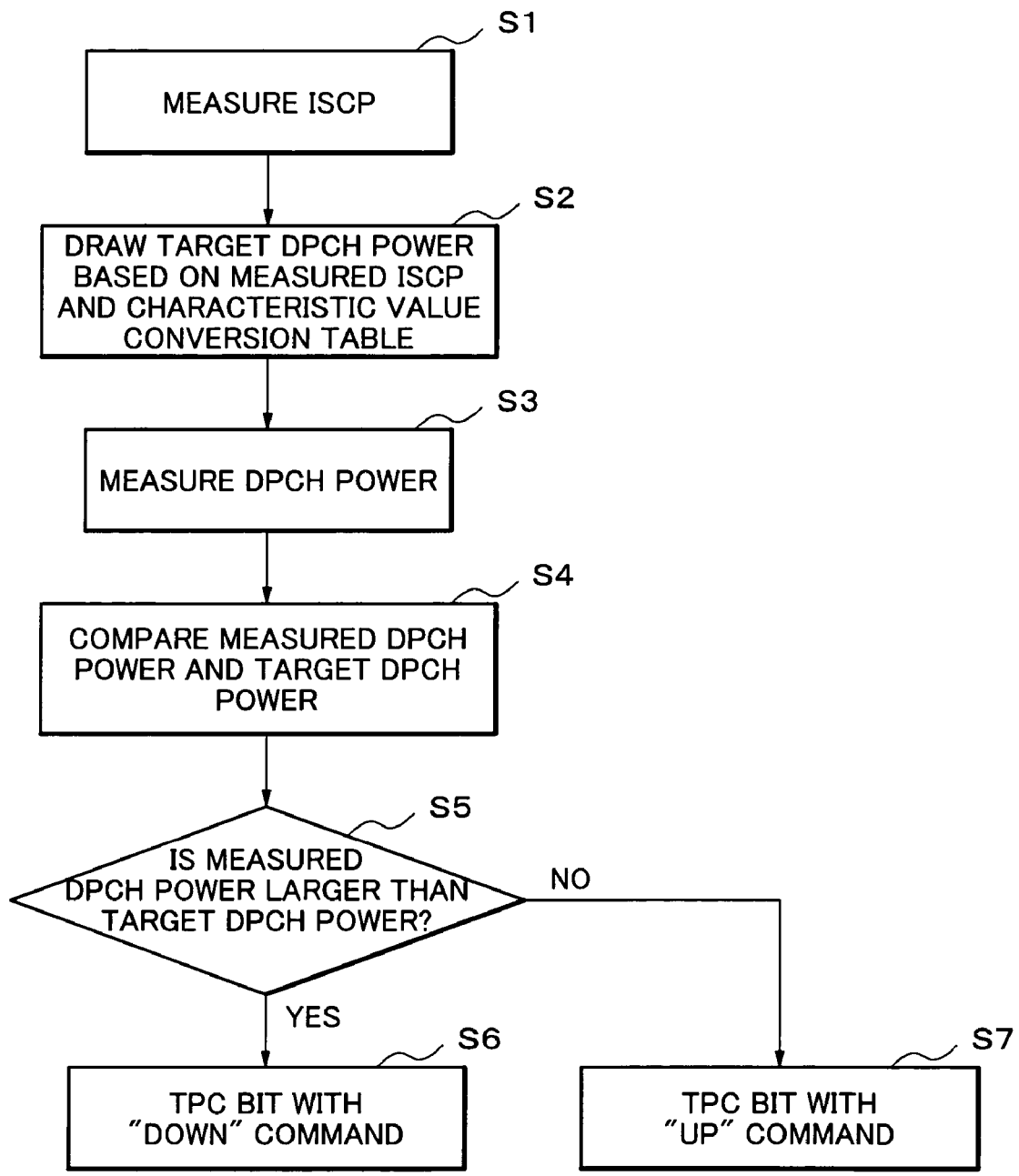
FIG. 3 is a flowchart for explaining an exemplary operation in case of performing a transmit power control in the mobile terminal shown in FIG. 1.

Next, the transmit power control operation of the mobile terminal of the present invention will be described with reference to FIGS. 1 to 4. FIG. 3 is a flowchart for explaining an exemplary operation in case of performing a transmit power control in the mobile terminal shown in FIG. 1. And, FIG. 4 is a diagram for explaining inner loop power control in a mobile communication system of the present invention. The processing operation shown in FIG. 3 is realized by the control unit 14 executing the programs in the recording unit 17.

First, the measurement unit 15 of the mobile terminal 1 measures an ISCP in a communication environment where the mobile terminal 1 itself is located (step S1 in FIG. 3).

Next, referring to the characteristic value conversion tool, the mobile terminal 1 obtains the required DPCH power (target DPCH power) based on the measured ISCP (step S2 in FIG. 3). Here, the characteristic value conversion tool stores a relationship between the ISCP and the target DPCH power, whose relationship satisfies a preset target BLER.

Subsequently, the mobile terminal 1 measures the presently-received DPCH power (measured DPCH power) (step S3 in FIG. 3), and compares the measured DPCH power and the target DPCH power (step S4 in FIG. 3).

As a result of comparing these, if the measured DPCH power is larger than the target DPCH power (step S5 in FIG. 3), the mobile terminal 1 transmits a TPC signal with a "DOWN" command to the radio base station 2 (step S6 in FIG. 3). On the other hand, if the measured DPCH power is smaller than the target DPCH power (step S5 in FIG. 3), the mobile terminal 1 transmits a TPC signal with an "UP" command to the radio base station 2 (step S7 in FIG. 3).

In a conventional closed-loop transmit power control using both inner loop power control and outer loop power control, since the BLER of use at present time has deteriorated, time until the mobile terminal 1 advances the demand which raises the DPCH power to the radio base station has been needed to some extent. On the other hand, the mobile terminal 1 of the present invention can accordingly request the DPCH power suitable for the communication environment of the mobile terminal 1 to the radio base station 2. In order to realize this operation, the mobile terminal 1 asks beforehand reception characteristics (relationship between the ISCP and the DPCH power, whose relationship satisfies the target BLER), and prepares the characteristic value conversion tool for drawing from the measured ISCP to the target DPCH power which satisfies the target BLER. Here, in above-mentioned explanation, the mobile terminal 1 first asks for the target DPCH power based on the measured ISCP, and transmits a TPC signal with an "up/DOWN" command to the radio base station 2 based on the result which compares the target DPCH and the measured DPCH. That is, although this operation is the explanation which performs two measurement, it is also possible to carry out simultaneously at once.

Meanwhile, the transmit power control of this invention can be operated according to the conditions shown below, in order to avoid that the measured SIR becomes very large by low measured quantity of ISCP, in the conventional closed-loop transmit power control.

(1) Operating when the measured ISCP has continued to be smaller than power quantity set up beforehand for a predetermined time or more.
(2) Operating only for a predetermined period with the time of fulfilling the above condition (1).
(3) Operating when the total amount of falls becomes beyond power quantity set up beforehand, as a result of lowering a target DPCH power in monotone more than predetermined time.
(4) Operating only for a predetermined period with the time of fulfilling the above condition (3).

Furthermore, in contrast to the above-mentioned conditions, the transmit power control of this invention can be restricted or stopped according to the conditions shown below.

(5) When the measured DPCH power changes into the state beyond a target DPCH power.

In this case, by suppressing useless operation of transmit power control, the power consumption of the mobile terminal can be reduced.

While this invention has been described in connection with certain exemplary embodiments, it is to be understood that the subject matter encompassed by way of this invention is not to be limited to those specific embodiments. On the contrary, it is intended for the subject matter of the invention to include all alternative, update, and equivalents as can be included within the spirit and scope of the following claims.

Further, the inventers' invention is to retain all equivalents of the claimed invention even if the claims are amended during prosecution.

What is claimed is:

1. A mobile communication system in which a transmit power of a transmitting end is controlled based on communication quality values measured in a receiving end, the mobile communication system comprising:
   a receiving equipment measuring an interference signal code power (ISCP) and a dedicated physical channel (DPCH) power, which are communication quality values in a present communication environment, determining a target DPCH power corresponding to the measured ISCP by referring to a quality characteristic value conversion tool previously prepared, comparing the measured DPCH power and the target DPCH power, and transmitting a transmit power control (TPC) signal based on a comparison result to a transmitting end; and
   a transmitting equipment controlling the DPCH power on transmit, based on the TPC signal received from the receiving end.

2. The mobile communication system according to claim 1, wherein the receiving equipment comprises the quality characteristic value conversion tool drawing a relationship between the ISCP and the DPCH power, whose relationship satisfies a preset target block error rate (BLER), using ISCP, DPCH power, and BLER which are previously measured in a present communication environment.

3. The mobile communication system according to claim 2, wherein the receiving equipment transmits the TPC signal with a "DOWN" command to the transmitting end in a case where the measured DPCH power is larger than the target DPCH power, and transmits the TPC signal with an "UP" command to the transmitting end in a case where the measured DPCH power is smaller than the target DPCH power.

4. The mobile communication system according to claim 3, wherein the receiving equipment transmits the TPC signal in a case where the measured ISCP has continued to be smaller than power quantity set up beforehand for a predetermined time or more.

5. The mobile communication system according to claim 4, wherein the receiving equipment transmits the TPC signal only for a predetermined period in a case where the measured ISCP has continued to be smaller than power quantity set up beforehand for a predetermined time or more.

6. The mobile communication system according to claim 3, wherein the receiving equipment transmits the TPC signal in a case where the total amount of falls becomes beyond power quantity set up beforehand, as a result of lowering the target DPCH power in monotone more than predetermined time.

7. The mobile communication system according to claim 6, wherein the receiving equipment transmits the TPC signal only for a predetermined period in a case where the total amount of falls becomes beyond power quantity set up beforehand, as a result of lowering the target DPCH power in monotone more than predetermined time.

8. A mobile terminal comprising:
a transmission/reception unit for transmitting and receiving radio signal to/from a radio base station;
a transmission/reception control unit for performing control relating to transmitting and receiving in the transmission/reception unit;
a measurement unit for measuring an interference signal code power (ISCP) and a dedicated physical channel (DPCH) power, which are communication quality values in a present communication environment;
a quality characteristic value conversion unit for drawing a relationship between an ISCP and a DPCH power; and
a control unit for determining a target DPCH power corresponding to the measured ISCP by referring to the quality characteristic value conversion unit, comparing the measured DPCH power and the target DPCH power, generating a transmit power control (TPC) signal based on a comparison result, and outputting the TPC signal to the transmission/reception control unit.

9. The mobile terminal according to claim 8, wherein the quality characteristic value conversion unit comprises a quality characteristic value conversion tool drawing a relationship between the ISCP and the DPCH power, whose relationship satisfies a preset target block error rate (BLER), using ISCP, DPCH power, and BLER which are previously measured in a present communication environment.

10. The mobile terminal according to claim 9, wherein the control unit outputs the TPC signal with a "DOWN" command in a case where the measured DPCH power is larger than the target DPCH power, and outputs the TPC signal with an "UP" command in a case where the measured DPCH power is smaller than the target DPCH power.

11. The mobile terminal according to claim 10, wherein the control unit outputs the TPC signal in a case where the measured ISCP has continued to be smaller than power quantity set up beforehand for a predetermined time or more.

12. The mobile terminal according to claim 11, wherein the control unit outputs the TPC signal only for a predetermined period in a case where the measured ISCP has continued to be smaller than power quantity set up beforehand for a predetermined time or more.

13. The mobile terminal according to claim 10, wherein the control unit outputs the TPC signal only for a predetermined period in a case where the total amount of falls becomes beyond power quantity set up beforehand, as a result of lowering the target DPCH power in monotone more than predetermined time.

14. The mobile terminal according to claim 13, wherein the control unit outputs the TPC signal only for a predetermined period in a case where the total amount of falls becomes beyond power quantity set up beforehand, as a result of lowering the target DPCH power in monotone more than predetermined time.

15. A transmit-power control method in a mobile terminal which transmits a transmit power control (TPC) signal to a transmitting end based on communication quality values, the transmit power control method comprising:
measuring an interference signal code power (ISCP) and a dedicated physical channel (DPCH) power, which are communication quality values in a present, communication environment;
determining a target DPCH power corresponding to the measured ISCP by referring to a quality characteristic value conversion tool previously prepared;
comparing the measured DPCH power and the target DPCH power; and
transmitting a TPC signal to the transmitting end based on a comparison result.

16. The method according to claim 15, wherein a receiving end comprises the quality characteristic value conversion tool drawing a relationship between the ISCP and the DPCH power, whose relationship satisfies a preset target block error rate (BLER), using ISCP, DPCH power, and BLER which are previously measured in a present communication environment.

17. The method according to claim 16, wherein the receiving end transmits the TPC signal with a "DOWN" command to the transmitting end in a case where the measured DPCH power is larger than the target DPCH power, and transmits the TPC signal with an "UP" command to the transmitting end in a case where the measured DPCH power is smaller than the target DPCH power.

18. The method according to claim 17, wherein the receiving end transmits the TPC signal in a case where the measured ISCP has continued to be smaller than power quantity set up beforehand for a predetermined time or more.

19. The method according to claim 18, wherein the receiving end transmits the TPC signal only for a predetermined period in a case where the measured ISCP has continued to be smaller than power quantity set up beforehand for a predetermined time or more.

20. The method according to claim 17, wherein the receiving end transmits the TPC signal only for a predetermined period in a case where the total amount of falls becomes beyond power quantity set up beforehand, as a result of lowering the target DPCH power in monotone more than predetermined time.

21. The method according to claim 20, wherein the receiving end transmits the TPC signal only for a predetermined period in a case where the total amount of falls becomes beyond power quantity set up beforehand, as a result of lowering the target DPCH power in monotone more than predetermined time.

22. A computer program recorded on a computer readable medium for executing transmit power control method which a receiving end performs based on measured communication quality for controlling transmit power of a transmitting end, the program comprising:

measuring an interference signal code power (ISCP) and a dedicated physical channel (DPCH) power, which are communication quality values in a present communication environment;

determining a target DPCH power corresponding to the measured, ISCP by referring to a quality characteristic value conversion tool previously prepared;

comparing the measured DPCH power and the target DPCH power; and transmitting a TPC signal to the transmitting end based on a comparison result.

23. The program according to claim 22, wherein the quality characteristic value conversion tool is used to draw a relationship between the ISCP and the DPCH power, whose relationship satisfies a preset target block error rate (BLER), using ISCP, DPCH power, and BLER which are previously measured in a present communication environment.

24. The program according to claim 23, wherein the TPC signal is transmitted with "DOWN" command to the transmitting end in a case where the measured DPCH power is larger than the target DPCH power, and is transmitted with an "UP" command to the transmitting end in a case where the measured DPCH power is smaller than the target DPCH power.

25. The program according to claim 24, wherein the TPC signal is transmitted in a case where the measured ISCP has continued to be smaller than power quantity set up beforehand for a predetermined time or more.

26. The program according to claim 25, wherein the TPC signal is transmitted only for a predetermined period in a case where the measured ISCP has continued to be smaller than power quantity set up beforehand for a predetermined time or more.

27. The program according to claim 24, wherein the TPC signal is transmitted only for a predetermined period in a case where the total amount of falls becomes beyond power quantity set up beforehand, as a result of lowering the target DPCH power in monotone more than predetermined time.

28. The program according to claim 27, wherein the TPC signal is transmitted only for a predetermined period in a case where the total amount of falls becomes beyond power quantity set up beforehand, as a result of lowering the target DPCH power in monotone more than predetermined time.

* * * * *